(12) United States Patent
Song et al.

(10) Patent No.: US 7,218,815 B2
(45) Date of Patent: May 15, 2007

(54) ATHERMAL ARRAYED WAVEGUIDE GRATING

(75) Inventors: Jeong-Hwan Song, Seoul (KR); Kyong-Shik Lee, Seoul (KR); Oh-Dal Kwon, Suwon-shi (KR); Sun-Tae Jung, Anyang-shi (KR); Myong-Won Kim, Songnam-shi (KR); Joon-Yong Cho, Inchonkwangyok-shi (KR); In-Jae Lee, Songnam-shi (KR); Bang-Weon Lee, Seoul (KR); Seung-Wan Lee, Suwon-shi (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 100 days.

(21) Appl. No.: 10/625,161

(22) Filed: Jul. 23, 2003

(65) Prior Publication Data

US 2004/0141689 A1   Jul. 22, 2004

(30) Foreign Application Priority Data

Jan. 21, 2003   (KR)   ............... 10-2003-0004028

(51) Int. Cl.
  *G02B 6/34*  (2006.01)
  *G02B 6/26*  (2006.01)
  *G02B 6/42*  (2006.01)

(52) U.S. Cl. ............... 385/37; 385/4; 385/10; 385/15; 385/16; 385/17; 385/20; 385/31; 385/32; 385/46; 385/50

(58) Field of Classification Search ............ 385/4, 385/10, 14–17, 20–24, 31–32, 37, 42–43, 385/46, 49–50

See application file for complete search history.

(56) References Cited

U.S. PATENT DOCUMENTS

| 4,812,012 | A  | * | 3/1989  | Terada et al. ............... 385/115 |
| 6,169,838 | B1 | * | 1/2001  | He et al. ..................... 385/129 |
| 6,304,687 | B1 | * | 10/2001 | Inoue et al. .................. 385/14 |
| 6,614,951 | B2 | * | 9/2003  | Lin .............................. 385/15 |
| 6,735,368 | B2 | * | 5/2004  | Parker et al. ............... 385/122 |
| 6,807,354 | B2 | * | 10/2004 | Nakagawa et al. ......... 385/132 |
| 2003/0021567 | A1 | * | 1/2003 | Yoneda ...................... 385/129 |
| 2003/0118284 | A1 | * | 6/2003 | Ide .............................. 385/37 |
| 2003/0123799 | A1 | * | 7/2003 | Lazaro Villa ............... 385/37 |
| 2004/0151459 | A1 | * | 8/2004 | Cheben et al. ............. 385/129 |
| 2004/0170355 | A1 | * | 9/2004 | Yamauchi et al. ........... 385/37 |

\* cited by examiner

FOREIGN PATENT DOCUMENTS

JP   1406099 A2 *  1/2003

OTHER PUBLICATIONS

Alcatel, Laid Open Application EP 01440418.0, Jul. 23, 2002.*

*Primary Examiner*—Frank G. Font
*Assistant Examiner*—Ryan Lepisto
(74) *Attorney, Agent, or Firm*—Cha & Reiter, L.L.C.

(57) ABSTRACT

An athermal arrayed-waveguide grating is disclosed and includes an input waveguide for inputting two or more optical signals from one exterior side, a grating array for separating the optical signals into different wavelengths of light, a first slab, formed with two layers and having different refractive indices from each other, for connecting the input waveguide with the grating array, a second slab for causing the different light wavelengths separated at the grating array to be imaged on an egress surface thereof, and an output waveguide array for outputting each light wavelength imaged on the egress surface of the second slab to the other exterior side in the form of a separated channel.

17 Claims, 2 Drawing Sheets

ATHERMAL ARRAYED WAVEGUIDE GRATING

CLAIM OF PRIORITY

This application claims priority to an application entitled "Athermal arrayed waveguide grating," filed in the Korean Intellectual Property Office on Jan. 21, 2003 and assigned Ser. No. 2003-4028, the contents of which are hereby incorporated by reference.

BACKGROUND OF THE INVENTION

1. Field of the Invention

The present invention relates to an athermal arrayed waveguide grating and, more particularly, to an arrayed waveguide grating capable of compensating wavelength changes according to variations in ambient temperature.

2. Description of the Related Art

With a recent burst of growth of various data services in the Internet field, there has been an increase in demand for higher transmission capacity. The current demand does not seem to slow down in any foreseeable future. The best economical plan of meeting this demand is to maximize the transmission capacity in the existing optical fibers. For example, an optical communication system is operated in a wavelength-division-multiplexing (WDM) mode in which a plurality of channels can be transmitted/received through a single optical fiber as one communication line, instead of installing additional optical fibers on a large scale. This type of optical-communication system was commercialized in 1995 for the first time, and since then the available transmission/reception capacity has been improved remarkably.

In the WDM systems, an optical device, such as an arrayed waveguide grating in which an optical waveguide is formed on a flat plate of silica by a combination of fiber optic technology with a large-scale-integrated (LSI) circuit technique, is used as a wavelength-division multiplexer/demultiplexer for allowing multiple wavelengths to be combined and separated for transmission/reception applications. However, the arrayed waveguide grating is sensitive to temperature change which in turn changes its refractive index according to the temperature changes. As a result, optical signals inputted into the arrayed-waveguide grating are subjected to a change in the phase, thereby causing a wavelength sweep.

In general, the arrayed-waveguide grating (AWG) includes an input waveguide, a grating array, first and second slabs, and an output waveguide array, and functions as a wavelength-division multiplexer/demultiplexer in which optical signals inputted from the outside are not only demultiplexed into a plurality of channels having different wavelengths but also multiplexed into one channel, and then outputs the multiplexed/demultiplexed resultant(s). The AWG may further include a temperature controller, thus preventing a wavelength sweep of outputted channel(s) caused by a change in ambient temperature. The temperature controller typically includes a heater device or a peltier device. An isothermal plate of copper, for instance, may also be inserted between the AWG and a heater or peltier device.

In operation, the input waveguide inputs external optical signals into the first slab. The grating array separates the inputted optical signals into different light wavelengths. The first slab connects the input waveguide with the grating array. Meanwhile, the second slab allows the separated wavelengths of light to be imaged on its egress surface. Further, the output-waveguide array allows each wavelength of light, which is imaged on the egress surface of the second slab, to be outputted to the outside in the form of a separated channel.

The AWG or waveguide module including the heater or peltier device as mentioned above is disclosed in the International Patent Application No. PCT/JP2001/00352 to Hiro Yoshiyuki, et al., entitled "Heater Module and Optical Waveguide Module," the teachings of which are hereby incorporated by reference.

Briefly, the AWG includes the temperature controller, so that the AWG suppresses a change in the phase of an optical signal caused by the temperature change as well as the wavelength sweep of each output channel. That is to say, the temperature controller allows the AWG to maintain a constant temperature, so that each output channel can be prevented from being swept in wavelength, thereby enabling the AWG to obtain a stable performance characteristic. However, because the conventional AWG employs a heater or peltier device as the temperature controller, the AWG must be always heated during operation. As a result, a power consumption for the AWG is increased. In addition, there are other drawbacks in that the prior art AWG which includes an increased volume, a complicated assembly process, an increased manufacturing cost, and so forth.

Accordingly, there is a need for an improved arrayed waveguide grating that is not sensitive to variations in ambient temperature that may be realized in a simple, reliable, and inexpensive implementation.

SUMMARY OF THE INVENTION

The present invention is related to an athermal arrayed waveguide grating capable of reducing power consumption and volume while enhancing the production efficiency.

In one embodiment, an athermal arrayed waveguide grating is provided and includes: an input waveguide for inputting two or more optical signals from one exterior side; a grating array for separating the optical signals into different wavelengths of light; a first slab, formed with two layers and having different refractive indices from each other, for connecting the input waveguide with the grating array; a second slab for causing the different wavelengths of light separated at the grating array to be imaged on an egress surface thereof; and, an output waveguide array for outputting each wavelength of light imaged on the egress surface of the second slab to the other exterior side in the form of a separated channel.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described in detail with reference to the accompanying drawings. For the purposes of clarity and simplicity, a detailed description of known functions and configurations incorporated herein will be omitted as it may make the subject matter of the present invention unclear.

Figure 1:
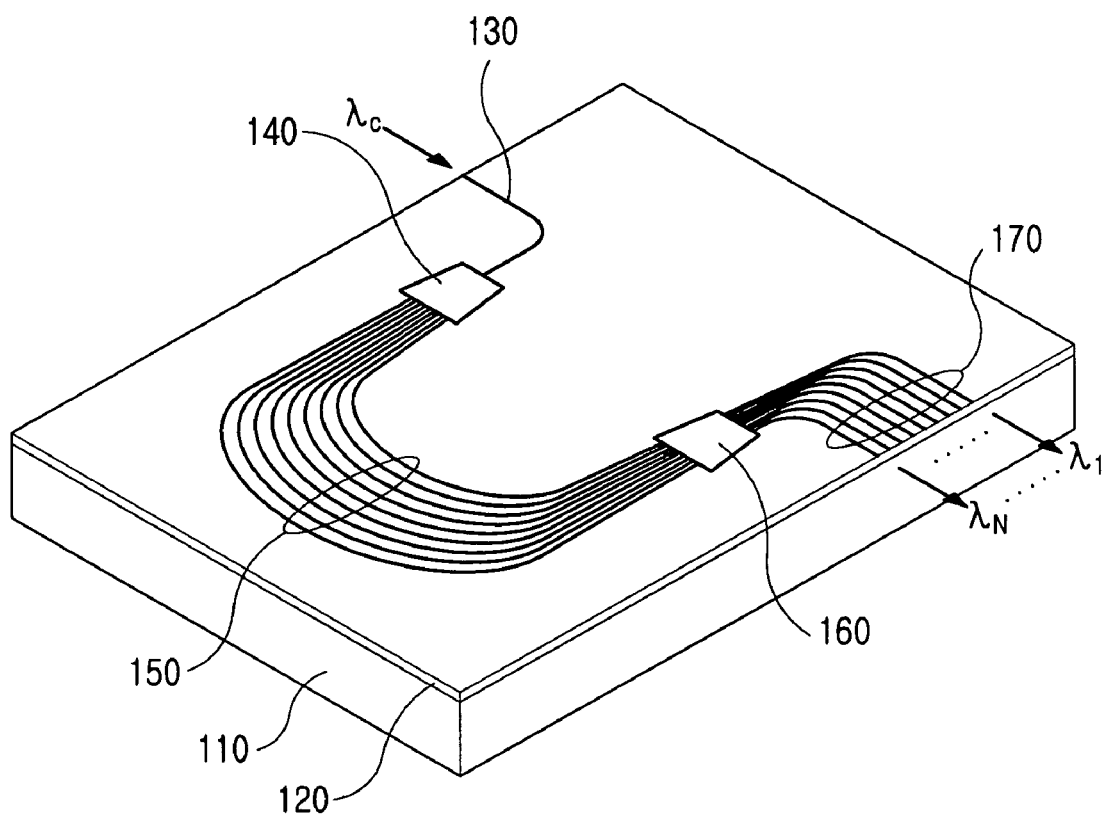
FIG. 1 is a perspective view showing an arrayed waveguide grating (AWG) according to an embodiment of the present invention; and, FIG. 2 is an enlarged plan view of portions of the input waveguide and the first slab shown in FIG. 1.

FIG. 1 is a perspective view showing an arrayed-waveguide grating (AWG) according to an embodiment of the present invention. As shown, the AWG comprises an optical layer 120 having a core layer and a clad layer and deposited on a substrate 110 of silica, an input waveguide 130, a first slab 140, a grating array 150, a second slab 160, and an output waveguide 170 formed on the optical layer 120. The input waveguide 130 serves to cause input optical signals to be inputted into the first slab 140, in which each optical signal has a preset wavelength range.

Figure 2:
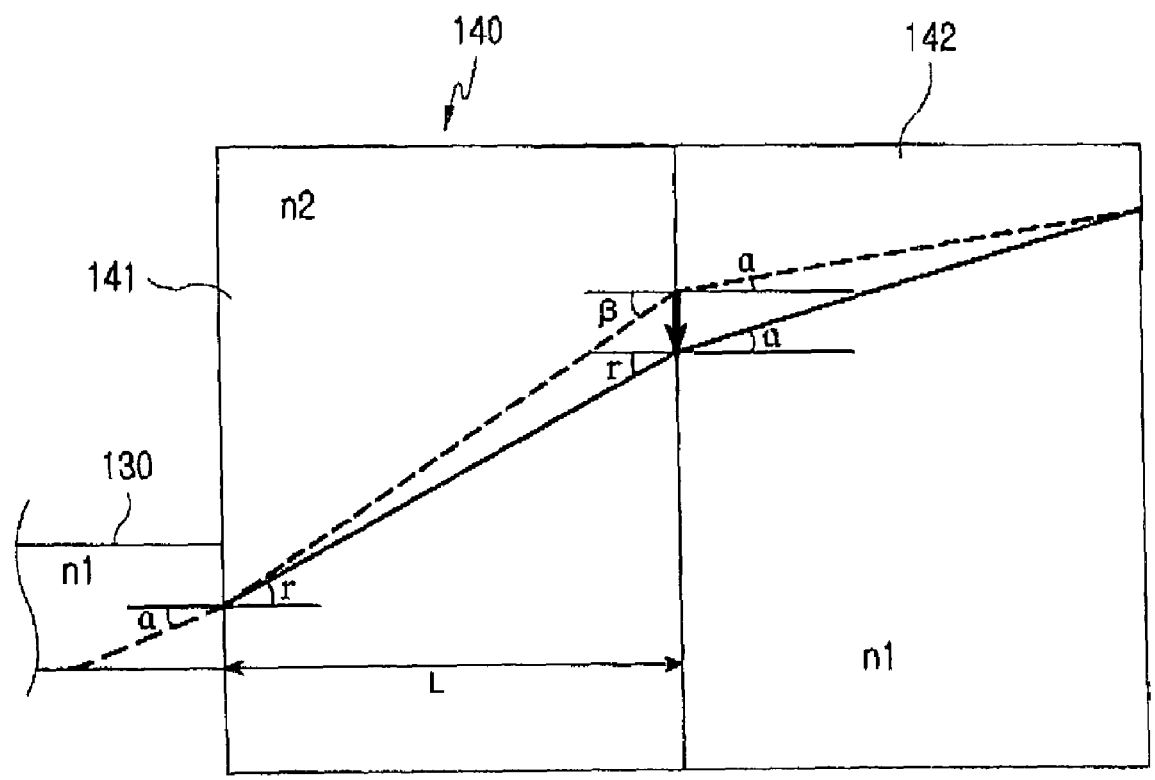

FIG. 2 is an enlarged view of the input waveguide 130 and the first slab 140 shown in FIG. 1. As shown in FIG. 2, the first slab 140 is operative to connect the input waveguide 130 with the grating array 150. The first slab 140 comprises first and second layers 141 and 142 having different refractive indices n1 and n2, wherein the first layer 141 has a different refractive index n2 than the input waveguide 130, and the second layer 142 has the same refractive index n1 as that of the input waveguide 130.

The input waveguide 130 is made up of a medium having the same refractive index n1 as that of the second layer 142, and is bounded on one side by the first layer 141. As such, an optical signal is incident on the input waveguide 130 at a predetermined incident angle $\alpha$.

The first layer 141 has a different refractive index n2 from that of the second layer 142 or the input waveguide 130. Therefore, an optical signal incident from the input waveguide 130 to the first layer 141 at an incident angle $\alpha$ is refracted at a predetermined refractive angle $\beta$. Note that the relationship among the refractive angle $\beta$ of the optical signal refracted at the first layer 141, the refractive index of the first layer 141, the incident angle $\alpha$ of the optical signal traveling through the input waveguide 130, and the refractive index of the input waveguide 130 follows Equation 1 according to Snell's law, as follows.

$$n_1 \sin \alpha = n_2 \sin \beta,$$ Equation 1 where n1 represents the refractive index of the input waveguide 130, $\alpha$ represents the incident angle of the optical signal traveling through the input waveguide 130, n2 represents the refractive index of the first layer 141, and $\beta$ represents the refractive angle of the optical signal refracted in the first layer 141.

The second layer 142 has a refractive index that is different from the first layer 141 but is equal to that of the input waveguide 130. Accordingly, the optical signal incident from the first layer 141 to the second layer 142 is refracted at a predetermined refractive angle $\alpha$ owing to a refractive index difference between the first and second layers 141 and 142. To be more specific, because the input waveguide 130 has the same refractive index as the second layer 142, the optical signal which passes through the first layer 141 and then enters the second layer 142 has the refractive angle $\alpha$ of the same gradient as that of the incident angle $\alpha$ of the optical signal which travels through the input waveguide 130.

Note that with a change in temperature, the refractive index of the first layer 141 varies. As a result, the optical signal incident on the first layer 141 is subjected to a refraction at a different refractive angle $\gamma$ from the original refractive angel $\beta$. However, the second layer 142 has the same refractive index n1 as that of the input waveguide 130, so that the optical signal incident on the second layer 142 is refracted at a refractive angle $\alpha$ which is equal to the incident angle $\alpha$ of the optical signal incident on the input waveguide 130.

As noted before, due to the change in external temperature, the optical signal traveling through the first layer 141 undergoes a change in its refractive angle $\gamma$. However, an optical path of the optical signal within the first slab 140 is transformed depending the degree of ambient-temperature changes. Regardless, the second layer 142 compensates for a change in the wavelength caused by the temperature change by reconverging the optical signal inputted from the first layer 141. The refractive index of the first layer 141 depending on the temperature change is changed differently compared with that of the second layer 142, and thereby the wavelength sweep resulting from the temperature change of the optical signal is corrected. Note that if dn/dT of material determining n2 and an incident angle are set to be independent from the temperature at a first slap constructed after the initial temperature condition is determined, the wavelength of an output unit at different temperature is not change.

The first slab according to the present invention may be constructed, for instance, so that the first layer 141 has a refractive index of 1.415 and a length of 21.07 μm in a direction in which the optical signal travels, and the second layer 142 has a refractive index of 1.46. In this case, an initial optical signal, which is inputted into the first slab 140 before the temperature is changed, allows the optical signal to have an incident angle $\alpha$ of 30° when it is incident on the first layer 141, and a refractive angle $\alpha$ of 30° when it travels through the second layer 142. Further, the optical signal traveling through the first layer 141 has a refractive angle $\beta$ of 31.03° when the temperature is not changed, but a refractive angle $\gamma$ of 30.5° when the temperature is changed. Accordingly, the refractive index of the first layer 141 has a change rate of about 0.025 per 1° C.

Referring back to FIG. 1, the grating array 150 comprises a plurality of waveguides having a different length from each other. The optical signals inputted from the first slab 140 are separated into different light wavelengths due to a length difference between the waveguides and are outputted to the second slab 160.

The second slab 160 receives the different light wavelengths separated by the grating array 150, and then causes the received light to be imaged on its egress surface. The output-waveguide array 170 is connected to the output side of the second slab 160 and functions as a passage for outputting each light imaged on the egress surface of the second slab 160 to the outside in the form of a separated channel, in which the separated channels $\lambda 1$ to $\lambda n$ have different wavelengths from each other.

As can be seen from the above, the AWG according to the present invention is formed with the first slab having different refractive indices from each other, so that it can compensate a wavelength sweep caused by a change in temperature without the conventional heater or peltier device. Therefore, the athermal arrayed-waveguide grating according to the present invention makes it possible to reduce its volume and manufacturing process.

What is claimed is:

1. An athermal arrayed-waveguide grating comprising:
   an input waveguide for inputting two or more optical signals;
   a grating array for separating the input optical signals into different light wavelengths;
   a first slab having a first layer and a second layer with different refractive indices from each other, said first layer being contiguous to the input waveguide, said second layer being disposed for coupling said first layer to the grating array;

a second slab for causing the different light wavelengths separated at the grating array to be imaged on an egress surface thereof; and, an output-waveguide array for outputting each light wavelength imaged on the egress surface of the second slab in a form of a separated channel, wherein the second layer is interposed between the first layer and the grating array and comprises a refractive index that is equal to that of the input waveguide.

2. An athermal arrayed-waveguide grating according to claim 1, wherein the first layer connected to the input waveguide comprises a predetermined refractive index that is different from the input waveguide.

3. An athermal arrayed-waveguide grating according to claim 2, wherein the first layer is formed by material having a refractive index of 1.415.

4. An athermal arrayed-waveguide grating according to claim 2, wherein the second layer is formed by material having a refractive index of 1.46.

5. An athermal arrayed-waveguide grating according to claim 2, wherein the first layer of the first slab has a length of 21.07 μm in a direction in which the optical signal travels.

6. An optical-waveguide device for guiding an optical signal comprising:

a substrate;

an input waveguide extending at least partially across the substrate, a grating array for separating the optical signals into different light wavelengths;

a first slab having a first layer and a second layer that are disposed in series between the input waveguide and the grating array so that the layers collectively couple the input waveguide to the grating array, the first layer being contiguous to the input waveguide; and, a second slab for coupling the different light wavelengths separated by the grating array to an output waveguide, where the refractive index of the first layer and the second layer is substantially different, wherein the refractive index of the second layer is the same as the input waveguide.

7. An optical-waveguide device of claim 6, wherein the input and output waveguides extend at least partially across the substrate.

8. An optical-waveguide device of claim 6, wherein the grating array extend at least partially across the substrate.

9. An optical-waveguide device of claim 6, wherein the first layer is formed by material having a refractive index of 1.415.

10. An optical-waveguide device of claim 6, wherein the second layer is formed by material having a refractive index of 1.46.

11. An optical-waveguide device of claim 6, wherein the first layer of the first slab has a length of 21.07 μm in a direction in which the optical signal travels.

12. The device of claim 6, wherein said second layer is disposed for coupling the grating array to said first layer, said first layer being disposed for coupling the input waveguide to said second layer.

13. A method of manufacturing an optical-waveguide device for guiding an optical signal, the method comprising steps of:

forming an input waveguide extending at least partially across the substrate;

forming a first slab having a first layer and a second layer extending at one end of the input waveguide, both layers having respective first and second ends, the first end of the first layer being contiguous to said one end of the input waveguide, the second end of the first layer being disposed to join the first end of the second layer, the first layer having a first refractive index value and the second layer having a second refractive index value;

forming a grating array disposed to join the second end of the second layer and extending at least partially across the substrate; and, forming a second slab extending at one end of the grating array and extending at least partially across the substrate, wherein the refractive index of the second layer is formed of a material with the same refractive index of the input waveguide.

14. The method of claim 13, further comprising the step of forming an output waveguide extending at one end of the second slab and extending at least partially across the substrate.

15. The method of claim 13, wherein the first layer is formed by material having a refractive index of 1.415.

16. The method of claim 13, wherein the second layer is formed by material having a refractive index of 1.46.

17. The method of claim 13, the first layer of the first slab has a length of 21.07 μm in a direction in which the optical signal travels.

* * * * *